(12) United States Patent
Kurachi et al.

(10) Patent No.: US 7,781,354 B2
(45) Date of Patent: Aug. 24, 2010

(54) GLASS COMPOSITION AND METHOD FOR PRODUCTION THEREOF, AND GLASS SUBSTRATE FOR INFORMATION DISPLAY DEVICE AND INFORMATION DISPLAY DEVICE USING THE SAME

(75) Inventors: Junji Kurachi, Tokyo (JP); Akihiro Koyama, Tokyo (JP)

(73) Assignee: AvanStrate Inc., Mie (JP)

( * ) Notice: Subject to any disclaimer, the term of this patent is extended or adjusted under 35 U.S.C. 154(b) by 64 days.

(21) Appl. No.: 11/793,169

(22) PCT Filed: Dec. 13, 2005

(86) PCT No.: PCT/JP2005/022862

§ 371 (c)(1),
(2), (4) Date: Jun. 14, 2007

(87) PCT Pub. No.: WO2006/064795

PCT Pub. Date: Jun. 22, 2006

(65) Prior Publication Data

US 2007/0270300 A1 Nov. 22, 2007

(30) Foreign Application Priority Data

Dec. 15, 2004 (JP) .............................. 2004-362233

(51) Int. Cl.
*C03C 3/11* (2006.01)
*G02F 1/1333* (2006.01)
*G09F 9/30* (2006.01)

(52) U.S. Cl. ....................................................... 501/56

(58) Field of Classification Search .................... 501/55, 501/56, 61

See application file for complete search history.

(56) References Cited

U.S. PATENT DOCUMENTS

| 6,635,592 B1 * | 10/2003 | Kosokabe et al. ............. 501/14 |
| 7,095,935 B2 * | 8/2006 | Suetsugu et al. ............ 385/129 |
| 2003/0051509 A1 | 3/2003 | Sakai et al. |
| 2005/0209083 A1 | 9/2005 | Takagi et al. |

FOREIGN PATENT DOCUMENTS

| JP | 06-016452 A * | 1/1994 |
| JP | 06-016453 A * | 1/1994 |
| JP | 2001-287929 | 10/2001 |
| JP | 2001-1287929 A | 10/2001 |
| JP | 2002-193635 A | 1/2002 |
| JP | 2002-193635 | 7/2002 |
| JP | 2003-160340 A | 6/2003 |
| JP | 2003-192377 | 7/2003 |
| JP | 2003-192377 A | 7/2003 |
| JP | 2003-300750 A | 10/2003 |
| WO | WO 03/054597 A2 * | 7/2003 |

OTHER PUBLICATIONS

Akira Naruse, Glass Kogaku, $1^{st}$ edition, Oct. 15, 1981, pp. 21 to 22.
Naruse, Akira. Glass Technology, first edition. Kyoritsu Shuppan Co., Ltd., Oct. 15, 1981. pp. 20-22.

* cited by examiner

*Primary Examiner*—Anthony J Green
(74) *Attorney, Agent, or Firm*—Hamre, Schumann, Mueller & Larson, P.C.

(57) ABSTRACT

The glass composition of the present invention includes the following components, expressed in mass %: 70% to 88% of $SiO_2$; 6% to 18% of $B_2O_3$; 0.5% to 4.5% of $Al_2O_3$; 0% to 0.5% of $Li_2O$; 0% to 0.5% of $Na_2O$; 2% to 10% of $K_2O$; and 0% to 2% of MgO+CaO+SrO+BaO, and the glass composition further includes chlorine (Cl). The glass composition of the present invention is used suitably as a glass substrate for an information display device.

8 Claims, No Drawings

GLASS COMPOSITION AND METHOD FOR PRODUCTION THEREOF, AND GLASS SUBSTRATE FOR INFORMATION DISPLAY DEVICE AND INFORMATION DISPLAY DEVICE USING THE SAME

TECHNICAL FIELD

The present invention relates to a glass composition that easily is degassed and refined and that is used suitably particularly as a glass substrate for an information display device and to a method of manufacturing the same, and it further relates to a glass substrate for an information display device using the glass composition and to an information display device using the glass substrate for an information display device.

BACKGROUND ART

As a glass composition employed for glass substrates for information display devices, particularly for active matrix liquid crystal display devices, a non-alkali borosilicate glass composition has been used. A typical example of the non-alkali borosilicate glass may be the code 7059 glass of Corning Inc. in the United States.

In recent years, such information display devices were required to be larger in size, and the employed glass substrates became larger in area as well. If defects, such as bubbles, exist in the glass substrates used for manufacturing the information display devices, it causes to reduce the manufacturing yield significantly.

To prevent bubbles from remaining in a glass article during processes of manufacturing glass articles is known as refinement. A method of adding a refining agent to a glass melt for refining the melt is generally known. Arsenic oxide, antimony oxide and fluoride are widely known as the refining agents. A method for employing tin, lanthanoid or a compound of them as a substitute for known refining agents is disclosed in JP2003-192377 A, for example.

On the other hand, one of the refinement methods without a refining agent is vacuum degassing. In this method, a glass melt is kept under a decompressed atmosphere. Thus, the gas dissolved in the melt easily forms bubbles. The bubbles in the melt are expanded by decompression to enhance their buoyancy, and they rise to disappear on a melt surface. The vacuum degassing is a method to refine by these two actions. An example of the vacuum degassing is disclosed in JP2003-160340 A.

Another refinement method without a refining agent is disclosed in JP2003-300750 A. The method disclosed in this publication is a method of refining by including gas, such as helium and neon, in the molten glass composition.

However, glass compositions for substrates of information display devices, such as a non-alkali borosilicate glass composition, have a characteristic of high viscosity as a melt (high viscosity at high temperatures). Since degassing and refining a melt with a high viscosity is not easy, it is fundamentally difficult to reduce defects such as bubbles in the glass substrate using these glass compositions.

In order to degas and refine such glass compositions with a high viscosity, arsenic oxide, antimony oxide or fluoride mentioned above are employed for a refining agent. However, the heavy load to the environment when using arsenic oxide has been pointed out with the increasing awareness for the environment in recent years. Accordingly, using these known refining agents should be avoided as much as possible.

In many of the Examples disclosed in JP2003-192377 A, $Sb_2O_3$, which is a known refining agent, is included. That is, it can be concluded that substituting all the alternative refining agents disclosed in this publication for known refining agent is difficult.

The vacuum degassing disclosed in JP2003-160340 A has problems, such as the ones below:

a melting furnace having a complicated structure with a difference of elevation is required;

sealing maintenance at high melting temperatures is required;

lining with expensive platinum materials is required;

specific structures and operations are required to fill the joints of the refractory;

frequent maintenances are required to maintain the specific structure; and the operation rate of the melting furnace is low.

The method of including gas in the molten glass, disclosed in JP2003-300750 A, does not fit into mass production. This is because the gas used for this method is expensive and the manufacturing costs become high when used in a large amount for mass production.

The following properties are required to glass compositions employed for the substrates of information display devices.

(1) To have an average linear thermal expansion coefficient similar to that of silicon materials, since silicon materials are employed for transistors for active matrix liquid crystal display devices. The average linear thermal expansion coefficient of silicon is about $32 \times 10^{-7}$ °$C.^{-1}$.

(2) To be able to endure high temperatures, since the glass substrates are exposed to heat treatments during the processes of manufacturing transistors. It is necessary that the glass compositions do not deform, melt and devitrify during the heat treatment.

(3) To be unaffected by treatment fluid for processing. The glass compositions should not inadequately melt by and should not become frosted from chemicals such as fluoric acid used in the processes of manufacturing transistors.

(4) To elute a less amount of alkali components. A large amount of alkali components is dispersed from the glass substrates to the transistors during the manufacturing processes when using glass substrates employing glass compositions eluting a large amount of alkali components. The transistors are deteriorated by the dispersion of the large amount of alkali, which results in impairment of the performance of information display devices. Among the alkali components, the sodium component in particular affects the devices largely.

DISCLOSURE OF INVENTION

It is an object of the present invention to provide a glass composition that easily can be degassed and refined at a low cost and is used suitably as a glass substrate for an information display device, particularly for an active matrix liquid crystal display device, and a method of manufacturing the same. In addition, it is another object of the present invention to provide a glass substrate for an information display device using the glass composition and an information display device using the glass substrate for an information display device.

The glass composition of the present invention includes the following components, expressed in mass %:

$SiO_2$ 70% to 88%;
$B_2O_3$ 6% to 18%;
$Al_2O_3$ 0.5% to 4.5%;

$Li_2O$ 0% to 0.5%;
$Na_2O$ 0% to 0.5%;
$K_2O$ 2% to 10%; and
$MgO+CaO+SrO+BaO$ 0% to 2%, and
the glass composition further includes chlorine (Cl).

The glass substrate for an information display device of the present invention uses the glass composition.

The information display device of the present invention uses the glass substrate for an information display device.

The method of manufacturing a glass composition of the present invention includes obtaining a glass composition by melting a glass batch prepared to have a predetermined composition. The glass composition includes the following components, expressed in mass %:
$SiO_2$ 70% to 88%;
$B_2O_3$ 6% to 18%;
$Al_2O_3$ 0.5% to 4.5%;
$Li_2O$ 0% to 0.5%;
$Na_2O$ 0% to 0.5%;
$K_2O$ 2% to 10%; and
$MgO+CaO+SrO+BaO$ 0% to 2%, and
the glass batch includes chloride.

BEST MODE FOR CARRYING OUT THE INVENTION

The glass composition of the present invention includes the following components, expressed in mass %:
$SiO_2$ 70% to 88%;
$B_2O_3$ 6% to 18%;
$Al_2O_3$ 0.5% to 4.5%;
$Li_2O$ 0% to 0.5%;
$Na_2O$ 0% to 0.5%;
$K_2O$ 2% to 10%; and
$MgO+CaO+SrO+BaO$ 0% to 2%, and
the glass composition further includes chlorine (Cl).

The glass composition preferably includes the following components, expressed in mass %:
$SiO_2$ 75% to 82%;
$B_2O_3$ 10% to 15%;
$Al_2O_3$ 0.5% to 3%;
$Li_2O$ 0% to 0.5%;
$Na_2O$ 0% to 0.5%;
$K_2O$ 4% to 8%; and
$Li_2O+Na_2O+K_2O$ 5% to 8%, and it is more preferable that the glass composition includes the following components, expressed in mass %:
$SiO_2$ 75% to 82%;
$B_2O_3$ 10% to 15%;
$Al_2O_3$ 0.5% to 3%; and
$K_2O$ 5% to 8%, and is substantially free from $Li_2O$ and $Na_2O$.

In the glass composition of the present invention, a chlorine content is preferably in a range from 0.005% to 1% expressed in mass %.

It is preferable that the glass composition of the present invention is substantially free from oxides of Pb, Sb, As, V, Ti and Ce. In the present description, "substantially free" means that the content is at a level of incorporation as an impurity, and in specific, it means equal to or less than 1 mass % and preferably equal to or less than 0.1 mass %.

It is preferable that the glass composition of the present invention is substantially free from oxide of As and oxide of Sb.

The glass composition of the present invention preferably has an average linear thermal expansion coefficient in a range from 50° C. to 350° C. falling within a range from $30 \times 10^{-7}$ °$C.^{-1}$ to $50 \times 10^{-7}$ °$C.^{-1}$.

The glass composition of the present invention is excellent in defoaming while melting compared to conventional glasses, such as a non-alkali borosilicate glass, due to the refining effect of chlorine inclusion in addition to the effect of the component combination. Thus, employing this glass composition provides a glass sheet that is free from components of heavy environmental load and has fewer defects, such as bubbles, at a low cost.

The glass composition of the present invention shows an average linear thermal expansion coefficient similar to that of silicon. It can be employed suitably for a glass substrate for an information display device due to this property. It is because the glass substrate for an information display device employing the glass composition of the present invention does not easily develop a warp or a stress caused by a thermal expansion difference to silicon.

The glass composition of the present invention is excellent in chemical durability, such as fluoric acid. It can be employed suitably for a glass substrate for an information display device due to this property. It is because the glass substrate fabricated by employing the glass composition of the present invention is safe from being affected undesirably even when exposed to chemicals during processes of manufacturing an information display device.

The glass composition of the present invention includes only a small amount of $Na_2O$ and $Li_2O$ as the components in the composition, or it is substantially free from $Na_2O$ and $Li_2O$. Thus, the amount of elution of $Na_2O$ and $Li_2O$ is extremely low or substantially zero. Due to this property, there is no risk that a glass substrate for an information display device employing the glass composition of the present invention damages the performance of an information display device by the alkali component eluted from the glass substrate.

The method of manufacturing a glass composition of the present invention is a method of manufacturing a glass composition including obtaining a glass composition by melting a glass batch prepared to have a predetermined composition. It is a method in which the glass composition includes the following components, expressed in mass %:
$SiO_2$ 70% to 88%;
$B_2O_3$ 6% to 18%;
$Al_2O_3$ 0.5% to 4.5%;
$Li_2O$ 0% to 0.5%;
$Na_2O$ 0% to 0.5%;
$K_2O$ 2% to 10%; and
$MgO+CaO+SrO+BaO$ 0% to 2%, and the glass batch includes chloride.

In the manufacturing method, the glass composition preferably includes the following components, expressed in mass %:
$SiO_2$ 75% to 82%;
$B_2O_3$ 10% to 15%;
$Al_2O_3$ 0.5% to 3%;
$Li_2O$ 0% to 0.5%;
$Na_2O$ 0% to 0.5%;
$K_2O$ 4% to 8%; and
$Li_2O+Na_2O+K_2O$ 5% to 8%, and it is more preferable that the glass composition includes the following components, expressed in mass %:
$SiO_2$ 75% to 82%;
$B_2O_3$ 10% to 15%;
$Al_2O_3$ 0.5% to 3%; and
$K_2O$ 5% to 8%, and is substantially free from $Li_2O$ and $Na_2O$.

In the manufacturing method of the present invention, the glass batch preferably includes the chloride in order that the glass composition includes chlorine in a range from 0.05% to 1% expressed in mass %.

In the manufacturing method of the present invention, the chloride is preferably at least one selected from alkali metal chloride and alkali earth chloride, and more preferably potassium chloride.

In the manufacturing method of the present invention, it is preferable that the glass composition is substantially free from oxides of Pb, Sb, As, V, Ti and Ce.

In the manufacturing method of the present invention, it is preferable that the glass composition is substantially free from oxide of As and oxide of Sb.

In the manufacturing method of the present invention, the glass composition preferably has an average linear thermal expansion coefficient in a range from 50° C. to 350° C. falling within a range from $30 \times 10^{-7}$ °C.$^{-1}$ to $50 \times 10^{-7}$ °C.$^{-1}$.

Reasons for the limitations in the components in the glass composition of the present invention are described below. It should be noted that mass % may be abbreviated simply as % in the following description.

($SiO_2$)

$SiO_2$ is an essential component that forms a glass skeleton. When an $SiO_2$ content is less than 70%, the heat resistance of the glass composition becomes low. On the other hand, when the $SiO_2$ content is more than 88%, the viscosity of the glass melt becomes so high that the refining of the melt is difficult. Thus, the $SiO_2$ content needs to be in the range from 70% to 88%, and preferably in the range from 75% to 82%.

($B_2O_3$)

$B_2O_3$ is an essential component that improves the meltability of a glass without increasing alkali elution from a glass composition. When a $B_2O_3$ content is less than 6%, melting a glass batch and refining a glass melt become difficult. On the other hand, since $B_2O_3$ is a component inducing phase separation of a glass composition, the phase separation tends to deteriorate chemical durability, to cause opalization and to lower heat resistance when the content is more than 18%. Thus, the $B_2O_3$ content needs to be in the range from 6% to 18%, and preferably in the range from 10% to 15%.

($Al_2O_3$)

$Al_2O_3$ is an essential component that enhances heat resistance and inhibits phase separation of a glass composition. The effect of inhibiting phase separation is remarkable when the $Al_2O_3$ content is equal to or more than 0.5%. However, $Al_2O_3$ is difficult to melt and, when the content is more than 4.5%, it remains in a glass as an unmelted inclusion and further makes difficult to defoam in a glass melt. Thus, the $Al_2O_3$ content needs to be in the range from 0.5% to 4.5%, and preferably in the range from 0.5% to 3%.

($K_2O$)

$K_2O$ is an essential component that enhances meltability of a glass, and it becomes difficult to melt a glass when the content is less than 2%. When a chloride ion exists in a glass melt, $K_2O$ vaporizes as potassium chloride at a temperature equal to or more than 1400° C. to enlarge and rise the bubbles in the glass melt and to homogenize the glass melt by the flow of the bubbles. In addition, since K ion has a larger ionic radius compared to Li and Na ions, their migration speed in a glass article is slow and the amount of K ions eluted from the glass article is extremely little. Thus, there is no risk that the performance of a product using a glass article made of the glass composition of the present invention is impaired by eluted K ions.

On the other hand, $K_2O$ is a component that enlarges a thermal expansion coefficient of a glass, and a thermal expansion coefficient difference relative to silicon materials is enlarged when it is more than 10%. Further, $K_2O$ volatilizes from a glass melt surface as potassium borate. When potassium borate is volatilized, the inhomogeneity of the glass melt becomes large and it largely causes cords due to $K_2O$ and $B_2O_3$ contents on a surface of a glass melt being different from those of inside, which is the part other than the surface. Thus, the $K_2O$ content needs to be in the range from 2% to 10%, preferably in the range from 4% to 8% and more preferably in the range from 5% to 8%.

($Na_2O$, $Li_2O$)

Both $Na_2O$ and $Li_2O$ are components that enhance the meltability of a glass and that have an effect of enhancing chemical durability of a glass composition by coexisting with $K_2O$. However, since Li and Na ions have smaller ionic radius compared to K ions, their migration speed in a glass is fast and thus they easily develop phase separation of a glass melt. In addition, a product using a glass article made of the glass composition of the present invention has a possibility that a performance of the product may be damaged due to the gradual elution of Li and Na ions from the glass article. Still in addition, $Na_2O$ and $Li_2O$ are easily volatilized from a glass melt surface as borate during melt similar to $K_2O$. When borate is volatilized, contents of $Na_2O$, $Li_2O$ and $B_2O_3$ on a surface of a glass melt become different from those of inside, which is the part other than the surface, similar to the volatilization of potassium borate. Naturally, the inhomogeneity of the glass melt becomes large and it largely causes cords. Further in addition, since Li and Na ions have faster migration speed in a glass melt, these ions diffuse with the content difference acting as their driving force. Due to the diffusion, the contents of $Na_2O$, $Li_2O$ and $B_2O_3$ at the inside of the glass melt, which is a part other than the surface, become inhomogeneous. Thus, the $Na_2O$ and $Li_2O$ contents need to be equal to or less than 0.5% each, and it is preferable that the melt is substantially free from $Na_2O$ and $Li_2O$.

(Total Amount of Alkali Metal Oxides)

In order to help melt a glass, contents of $Li_2O$, $Na_2O$ and $K_2O$, which are so-called alkali oxides, are preferably in a range from 5% to 8% in total.

(Alkali Earth Metal Oxides)

Alkali earth metal oxides, such as MgO, CaO, SrO and BaO, are components that prevent phase separation and enhance chemical durability by inhibiting the migration of alkali ions in a glass and enhance heat resistance of a glass. However, when the content is more than 2% in total, they damage the quality of glass in bubbles because refinement due to volatilization of chloride on melting is hindered. Thus, the content of alkali earth needs to be equal to or less than 2% and preferably equal to or less than 0.5%.

(Chlorine and Chloride)

Since the glass composition of the present invention includes chlorine (hereinafter, may be referred to Cl), it is easy to obtain a glass article with fewer remaining bubbles. Chlorine preferably is included in the glass composition by melting a glass batch in which chloride, particularly alkali metal chloride or alkali earth metal chloride, is added. Such a process enables achieving an effective refinement effect by chlorine to a glass melt.

Although the refinement mechanism by chloride in the glass composition of the present invention is not fully figured out, the inventors consider it as follows.

The boiling point of chloride, particularly alkali metal chloride, is approximate to a temperature range suitable for melting the glass composition of the present invention, such as a range from 1400° C. to 1650° C. The boiling point of LiCl is in a range from 1325° C. to 1360° C., the boiling point of NaCl is at a temperature of 1413° C. and KCl sublimates at a temperature of 1500° C. That is, the vapor pressure of alkali metal chloride is considered to be as high as atmospheric pressure within the temperature range suitable for melting the glass composition of the present invention.

Thus, chlorine can be bonded to alkali metal and become a gas of alkali metal chloride in the glass melt while melting the glass composition of the present invention. The gas of alkali metal chloride has an effect in which bubbles rise by forming or enlarging bubbles in the glass melt, broken on the glass melt surface and removed from the glass melt. The glass composition is considered to be refined due to such mechanism.

On the other hand, when the residue of Cl after melting is too much, Cl condenses inside the glass in forming, and it tends to form bubbles including chloride crystal and to develop phase separation and devitrification of the glass. Thus, the Cl content in the glass composition after the melt and the formation is preferably in the range from 0.005% to 1%, and more preferably in the range from 0.005% to 0.3%.

(Components Preferably Not Contained)

It is preferable that the glass composition of the present invention is substantially free from oxides of Pb, Sb, As, V, Ti and Ce. This is because the refining effect of chlorine may be harmed when the glass composition of the present invention includes these compounds.

Although the mechanism by which the oxides harm the refining of the glass composition of the present invention is not yet figured out, the inventors consider the possibilities as follows.

First, among these oxides, the oxides having Pb, Sb, As, V and Ti as cations are described. The boiling points of chlorides having these metals as cations are extremely low compared to the temperature range suitable for melting the glass composition of the present invention. Thus, during the beginning period of melting glass batch, i.e. while the glass batch is not melted sufficiently, a part of the chlorine is volatilized in a form of chloride of these metals. When it reaches the temperature suitable for refinement, sufficient chlorine does not remain in the glass melt. Accordingly, there may be a possibility that the refining effect by chlorine becomes insufficient.

Next, among these oxides, the oxide having Ce as cation is described. Although the boiling point of chloride of Ce is at the temperature of 1727° C. and the above problem does not take place, the refinement by chlorine is inhibited. The reason is not yet clearly figured out, but one possible consideration is that a valence change of Ce ions, which can be in both states of trivalence and quadrivalence in a glass, takes place at a particular temperature in a particular situation and inhibits the refinement property of chlorine.

(Other Components)

The glass composition of the present invention may include components other than those described above for the purposes of controlling a refractive index, controlling thermal viscosity property, improving devitrification and the like. Components, such as $ZnO$, $ZrO_2$, $Y_2O_3$, $La_2O_3$, $Ta_2O_5$, $Nb_2O_5$, $GeO_2$ or $Ga_2O_5$, may be included as other components up to 3% in total.

In addition, components that are included in an industrially available glass batch as trace impurities and are not mentioned above may be incorporated in some cases. An example of such trace impurities may be $Fe_2O_3$. When a total content of these impurities is less than 0.5%, the influence on the physical properties of the glass composition is small and it does not cause a substantial problem.

Then, the glass composition of the present invention is described in detail with Examples. The present invention, however, is not limited to the following description.

EXAMPLES

Glass bodies for Examples 1 to 9 and Comparative Examples 1 to 3 are fabricated according to the processes below in order to have the glass compositions shown in Tables 1 and 2. Residue of Cl, temperature for devitrification, glass transition point, number of bubbles per 1 cm³, density, an average linear thermal expansion coefficient, Vickers hardness and etching rate for fluoric acid of each obtained glass body were measured and further heat resistance, refinement property and acid resistance were evaluated.

TABLE 1

| | | Example 1 | Example 2 | Example 3 | Example 4 | Example 5 | Example 6 |
|---|---|---|---|---|---|---|---|
| Composition (mass %) | $SiO_2$ | 79.2 | 76.5 | 78.1 | 79.5 | 80.3 | 80.4 |
| | $Al_2O_3$ | 2.3 | 2.2 | 2.2 | 2.3 | 2.3 | 1.1 |
| | $B_2O_3$ | 12.4 | 12.3 | 13.5 | 12.5 | 11.4 | 12.4 |
| | $Li_2O$ | 0 | 0 | 0 | 0 | 0 | 0 |
| | $Na_2O$ | 0 | 0 | 0 | 0 | 0 | 0 |
| | $K_2O$ | 6.1 | 9.0 | 6.1 | 5.4 | 6.1 | 6.1 |
| | MgO | 0 | 0 | 0 | 0 | 0 | 0 |
| | CaO | 0 | 0 | 0 | 0.4 | 0 | 0 |
| | SrO | 0 | 0 | 0 | 0 | 0 | 0 |
| | BaO | 0 | 0 | 0 | 0 | 0 | 0 |
| | $ZrO_2$ | 0 | 0 | 0 | 0 | 0 | 0 |
| Residue of Cl (mass %) | | 0.11 | 0.12 | 0.13 | 0.13 | 0.12 | 0.13 |
| Temperature for Devitrification (° C.) | | <980 | <980 | <980 | <980 | <980 | <980 |
| Glass Transition Point (° C.) | | 559 | 594 | 555 | 576 | 568 | 571 |
| Heat Resistance Evaluation | | Good | Good | Good | Good | Good | Good |
| Number of Bubbles per 1 cm³ | | 136 | 0 | 24 | 48 | 0 | 16 |

TABLE 1-continued

|  | Example 1 | Example 2 | Example 3 | Example 4 | Example 5 | Example 6 |
|---|---|---|---|---|---|---|
| Refinement Property Evaluation | Excellent | Excellent | Excellent | Excellent | Excellent | Excellent |
| Density (d/g · cm$^{-3}$) | 2.2 | 2.3 | 2.2 | 2.2 | 2.2 | 2.2 |
| Average Linear Thermal Expansion Coefficient (10$^{-7}$° C.$^{-1}$) | 35 | 49 | 40 | 34 | 37 | 37 |
| Vickers Hardness (kg · mm$^{-2}$) | 526 | 542 | 521 | 520 | 528 | 545 |
| Etching Rate for 0.2% Fluoric Acid Aqueous Solution (nm · min$^{-1}$) | 11 | 13 | 16 | 15 | 13 | 13 |
| Acid Resistance Evaluation | Excellent | Excellent | Excellent | Excellent | Excellent | Excellent |
| Overall Evaluation | Excellent | Excellent | Excellent | Excellent | Excellent | Excellent |

TABLE 2

|  |  | Example 7 | Example 8 | Example 9 | Comparative Example 1 | Comparative Example 2 | Comparative Example 3 |
|---|---|---|---|---|---|---|---|
| Composition (mass %) | SiO$_2$ | 77.5 | 77.4 | 78.4 | 49 | 81 | 72.5 |
|  | Al$_2$O$_3$ | 2.2 | 2.3 | 2.3 | 10 | 2 | 5 |
|  | B$_2$O$_3$ | 12.3 | 12.5 | 14.7 | 15 | 13 | 13.5 |
|  | Li$_2$O | 0 | 0 | 0 | 0 | 0 | 0 |
|  | Na$_2$O | 0 | 0 | 0 | 0.3 | 4 | 6.4 |
|  | K$_2$O | 6.0 | 6.1 | 4.6 | 0 | 0 | 0 |
|  | MgO | 0 | 0 | 0 | 0 | 0 | 0 |
|  | CaO | 0 | 1.8 | 0 | 0 | 0 | 0.8 |
|  | SrO | 0 | 0 | 0 | 0.4 | 0.0 | 0 |
|  | BaO | 0 | 0 | 0 | 25 | 0 | 1.3 |
|  | ZrO$_2$ | 1.9 | 0 | 0 | 0 | 0 | 0.5 |
| Residue of Cl (mass %) |  | 0.12 | 0.14 | 0.10 | 0 | 0 | 0 |
| Temperature for Devitrification (° C.) |  | <980 | <980 | <980 | — | <980 | — |
| Glass Transition Point (° C.) |  | 574 | 606 | 528 | 630 | 551 | 575 |
| Heat Resistance Evaluation |  | Good | Good | Good | Good | Good | Good |
| Number of Bubbles per 1 cm$^3$ |  | 32 | 0 | 112 | 5000 | 800 | 40 |
| Refinement Property Evaluation |  | Excellent | Excellent | Excellent | Fair | Poor | Good |
| Density (d/g · cm$^{-3}$) |  | 2.2 | 2.3 | 2.2 | 2.8 | 2.23 | 2.36 |
| Average Linear Thermal Expansion Coefficient (10$^{-7}$° C.$^{-1}$) |  | 37 | 39 | 34 | 46 | 33 | 51 |
| Vickers Hardness (kg · mm$^{-2}$) |  | 531 | 559 | 504 | 630 | 546 | 548 |
| Etching Rate for 0.2% Fluoric Acid Aqueous Solution (nm · min$^{-1}$) |  | 19 | 14 | 25 | 590 | 68 | 46 |
| Acid Resistance Evaluation |  | Excellent | Excellent | Excellent | Poor | Fair | Fair |
| Overall Evaluation |  | Excellent | Excellent | Excellent | Poor | Poor | Poor |

(Fabrication of Sample Glass)

First, raw materials for glass (batches) were prepared by using silica, alumina, lithium carbonate, sodium carbonate, potassium carbonate, basic magnesium carbonate, calcium carbonate, strontium carbonate and zirconium dioxide, which are common raw materials for glass, and further mixing potassium chloride appropriately in order to provide the glass compositions shown in Tables 1 and 2. Potassium chloride was not added to the glass batches employed for fabricating the glass compositions of the Comparative Examples 1 to 3.

Among them, potassium chloride was added to the batches in the amount equivalent to 0.4 g for 100 g of glass composition when volatilization is assumed not to lower the potassium chloride content. The amounts of Cl indicated in the Tables are values obtained by quantitatively analyzing the fabricated glass bodies by fluorescent X-ray analysis.

Each prepared batch was melted and refined in a platinum crucible. Firstly, the crucible was maintained for two hours in an electric furnace set at a temperature of 1350° C. to melt each batch. Secondly, each glass melt was refined by raising the temperature of the electric furnace up to 1550° C. kept two hours. After that, the glass melt was poured on an iron plate outside the furnace and it was cooled and solidified to obtain the glass body. The glass body subsequently was subjected to an operation of annealing. The annealing was carried out by keeping the glass body in another electric furnace set at a temperature of 650° C. for 30 minutes and then turning off the electric furnace to cool down to room temperature. The glass body that underwent the operation of annealing was made a sample glass.

(Measurement of Density)

The densities of sample glasses were measured by Archimedes' principle using pure water as immersion liquid.

(Measurement of Average Linear Thermal Expansion Coefficient and Glass Transition Point)

Glass specimens in a cylinder shape of 5 mm in diameter and 15 mm in length were made from the sample glasses using a common glass processing technique. The average linear thermal expansion coefficient and the glass transition point of each glass specimen were measured by using a differential thermomechanical analyzer (Thermoflex TMA 8140, manufactured by Rigaku Corporation).

(Measurement of Devitrification Temperature)

Firstly, test samples for measuring devitrification temperature were fabricated by crushing the sample glasses. Specifically, the sample glasses were crushed by using an agate mortar, and glass grains that passed through a sieve of 2380 μm and remained on a sieve of 1000 μm were sift. The glass grains were immersed in ethanol, cleaned ultrasonically and then dried in a thermostat to make them the test samples for measuring devitrification temperature.

Secondly, devitrification was generated by keeping the test samples for measuring devitrification temperature in a temperature gradient furnace for a predetermined time. Specifically, 25 g of each test sample were put into a platinum boat of 12 mm in width, 200 mm in length and 10 mm in depth at an almost constant thickness. The platinum boat subsequently was kept in an electric furnace having a temperature gradient from 980° C. to 1180° C. for two hours to generate devitrification, and then the platinum boat was taken out of the furnace and was left to cool down to room temperature.

Lastly, the devitrification generated inside the glass on the platinum boat was observed using an optical microscope of a magnification of 40 times, and the maximum temperature at which the devitrification was observed was defined as the devitrification temperature.

(Evaluation of Acid Resistance)

The acid resistance was evaluated with the etching rate (erosion rate) when exposed to fluoric acid. Firstly, the sample glasses were cut and grinded to form a substrate shape. The surfaces were then optically polished, and then a part of the optically polished surface was masked with an acid resistant resin to make specimens for acid resistance evaluation. Consequently, these specimens were immersed in 0.2% fluoric acid aqueous solution heated at a temperature of 60° C. and they were etched. Since the unmasked parts on the specimens were etched by fluoric acid, while the masked parts were not etched, stepwise elevation changes were developed between the masked and the unmasked parts. The changes were measured by a surface roughness meter, and the fluoric acid resistance was evaluated by calculating the erosion rate per unit time.

(Evaluation of Refinement Property)

The sample glasses were observed by an optical microscope of a magnification of 40 times, and the number of bubbles per 1 $cm^3$ of each glass was calculated by the thickness, the viewing area and the observed number of bubbles. Since this method employs simplified melting using a crucible, the calculated number of bubbles is extremely large compared to the number of bubbles included in an actual glass body produced in commercial scale. It is known, however, that the less the number of bubbles calculated by this method is, the less the number of bubbles included in a glass body produced on a commercial scale is. Thus, this method can serve as an index of the refinement property.

(Evaluation of Heat Resistance)

The heat resistance was evaluated as Good when the glass transition point was equal to or more than 550° C.

(Measurement of Vickers Hardness)

The sample glasses were cut and ground, and then a surface of each was optically polished to fabricate test samples for measuring Vickers hardness. In order to measure Vickers hardness, a Vickers hardness tester (MVK-G2 type, manufactured by Akashi Corporation) was employed. Firstly, a 200 g of Vickers indenter made of diamond was loaded on the optically polished surface of each test sample for measurement for 30 seconds of load application time. After removing the load, the impression size was observed to measure by the microscope integrated into the hardness tester, and the measurement value was input in the hardness tester to obtain the Vickers hardness. After verifying that the impression does not develop a crack, an average value of five measurements was used as a measurement value of Vickers hardness.

Examples 1 to 9

As shown in Tables 1 and 2, the numbers of bubbles remaining in the sample glasses of the Examples 1 to 9 were very small compared to those of the Comparative Examples. Moreover, refining agents of heavy environmental load, such as arsenic oxide, were not added to the sample glasses of the Examples. Thus, it was found from these results that a glass substrate having extremely few defects, such as bubbles, could be manufactured without using refining agents such as arsenic oxide according to the glass composition of the present invention.

In addition, the glass compositions of the Examples 1 to 9 had etching rates for fluoric acid as small as in the range from 10 nm/min to 25 nm/min, and the specimens for acid resistance evaluation was not frosted after the etching. That is, they were not affected by fluoric acid, and they were excellent in acid resistance. Accordingly, a glass substrate for information display devices fabricated by using the glass composition of the present invention is not affected by chemicals used during processes of manufacturing an information display device.

Still in addition, the glass compositions of the Examples 1 to 9 had the average linear thermal expansion coefficient in the range from $30 \times 10^{-7}$ °$C.^{-1}$ to $50 \times 10^{-7}$ °$C.^{-1}$. These values are sufficiently close to the average linear thermal expansion coefficient of silicon materials (about $32 \times 10^{-7}$ °$C.^{-1}$). Thus, a glass substrate for information display devices fabricated by using the glass composition of the present invention does not easily develop a warp or a stress when employed with silicon materials.

Still in addition, the glass transition points $T_g$ of the glass compositions of the Examples 1 to 9 were all equal to or more than 500° C. Thus, a glass substrate for information display devices fabricated by using the glass composition of the present invention does not develop inconvenience, such as deformation, softening and devitrification, when exposed to the heat treatment history used during processes of manufacturing an information display device.

The densities of the glass compositions of the Examples 1 to 9 were all in the range from 2.2 g·cm$^{-3}$ to 2.3 g·cm$^{-3}$. These values are lighter than the values in a range from 2.5 g·cm$^{-3}$ to 2.8 g·cm$^{-3}$ of the glass body of the Comparative Example 1, other non-alkali borosilicate glass and architectural float plate glass. Thus, a glass substrate for information display devices fabricated by using the glass composition of the present invention can achieve weight reduction of an information display device.

Further in addition, the temperatures for devitrification of the glass compositions of the Examples 1 to 9 were all less than 980° C. Such temperature for devitrification means devitrification is not developed up to less than 980° C. when a glass melt is cooled to solidify a glass melt. Thus, manufacturing methods such as float, down draw and fusion processes can be employed when manufacturing a planar glass sheet from the glass composition of the present invention. Among the manufacturing methods listed here, the floating processes particularly enable a mass production of glass sheets having large areas with excellent evenness and surface smoothness.

Comparative Example 1

The Comparative Example 1 is a glass body having the same composition as a common glass composition used as a substrate for a liquid crystal display device. Since the number of bubbles in the Comparative Example 1 was as many as 5000 bubbles/cm$^3$, the composition of the Comparative Example 1 had an unfavorable refinement property. In addition, the etching rate of the Comparative Example 1 was as large as 590 nm/min. Thus, it is not preferable to employ the glass substrate being the composition of the Comparative Example 1 for purposes requiring a treatment by an acid chemical or gas during manufacture and while in use.

Comparative Example 2

The glass body of the Comparative Example 2 was also poor in refinement property due to the large number of bubbles compared to the Examples 1 to 9. In addition, since it includes sodium, which has a high migration speed in a glass, cords were developed in the glass body due to the volatilization. Still in addition, when the glass composition of the Comparative Example 2 is employed for a glass substrate for a liquid crystal display device, there is a possibility of inhibiting functions of the electrode or the liquid crystal due to the elution of sodium from the glass substrate. Further in addition, since the etching rate of the Comparative Example 2 was as large as 68 nm/min, it is not preferable to employ the glass substrate having the composition of the Comparative Example 2 for purposes requiring a treatment by an acid chemical or gas during manufacture and while in use.

Comparative Example 3

Since the glass body of the Comparative Example 3 had the number of bubbles close to the Examples, it can be considered good in refinement property. However, since it includes sodium, which has a high migration speed in a glass, strong cords were developed in the glass body due to the volatilization and the phase separation, and the average linear thermal expansion coefficient was as large as 51×10$^{-7}$° C.$^{-1}$. Thus, when the glass substrate having the composition of the Comparative Example 3 is employed for a substrate for a liquid crystal display device, there are possibilities of inhibiting functions of the electrode or the liquid crystal due to the elution of sodium from the glass substrate and developing a warp in the display device due to the thermal expansion difference relative to silicon. Since the etching rate of the Comparative Example 3 was as large as 46 nm/min, it is not preferable to employ the glass substrate having the composition of the Comparative Example 3 for purposes requiring exposure to an acid chemical or gas.

As understood from these Examples and Comparative Examples, the glass composition of the present invention is easily refined, has an average linear thermal expansion coefficient in a range from 30×10$^{-7}$° C.$^{-1}$ to 50×10$^{-7}$° C.$^{-1}$ and is excellent in acid resistance. In addition, the glass composition of the present invention is suitable for high yield, high efficiency and low cost manufacture of a glass substrate for an information display device, particularly a large area glass substrate suitable for an active matrix liquid crystal display device.

INDUSTRIAL APPLICABILITY

The glass composition of the present invention and the method of manufacturing the same are effectively used to provide a glass article requiring excellent chemical durability and heat resistance and a small thermal expansion coefficient, particularly to provide a glass substrate for an information display device. In addition, they also can be employed for purposes requiring a glass article being free from components with heavy environmental load, such as arsenic oxide and antimony oxide.

The invention claimed is:

1. A glass composition consisting essentially of the following components, expressed in mass %:
   $SiO_2$ 76.5% to 88%;
   $B_2O_3$ 6% to 18%;
   $Al_2O_3$ 0.5% to 4.5%;
   $Li_2O$ 0% to 0.5%;
   $Na_2O$ 0% to 0.5%;
   $K_2O$ 2% to 10%;
   $MgO+CaO+SrO+BaO$ 0% to 0.4%; and
   chlorine (Cl),
   wherein an etching rate of the glass composition with 0.2% fluoric acid is in a range from 0 nm/min to 25 nm/min.

2. The glass composition according to claim 1, consisting essentially of the following components, expressed in mass %:
   $SiO_2$ 76.5% to 82%;
   $B_2O_3$ 10% to 15%;
   $Al_2O_3$ 0.5% to 3%;
   $Li_2O$ 0% to 0.5%;
   $Na_2O$ 0% to 0.5%;
   $K_2O$ 4% to 8%;
   $Li_2O+Na_2O+K_2O$ 5% to 8%; and
   chlorine (Cl).

3. The glass composition according to claim 2, consisting essentially of the following components, expressed in mass %:
   $SiO_2$ 76.5% to 82%;
   $B_2O_3$ 10% to 15%;

Al$_2$O$_3$ 0.5% to 3%;
K$_2$O 5% to 8%; and
chlorine (Cl), and
the glass composition being substantially free from Li$_2$O and Na$_2$O.

4. The glass composition according to claim 1, wherein a content of the chlorine is in a range from 0.005% to 1% expressed in mass %.

5. The glass composition according to claim 1, wherein the glass composition is substantially free from oxides of Pb, Sb, As, V, Ti and Ce.

6. The glass composition according to claim 1,
wherein an average linear thermal expansion coefficient of the glass composition in a range from 50° C. to 350° C. falls within a range from $30 \times 10^{-7}$° C.$^{-1}$ to $50 \times 10^{-7}$° C.$^{-1}$, and
a glass transition point of the glass composition is no lower than 500° C.

7. A glass substrate for an information display device comprising the glass composition according to claim 1.

8. An information display device comprising the glass substrate for an information display device according to claim 7.

* * * * *